(12) United States Patent
Jahnke

(10) Patent No.: US 7,580,965 B2
(45) Date of Patent: Aug. 25, 2009

(54) DISCRETE-TIME CONVOLUTION CYCLE REDUCTION WITH PROGRAMMABLE DIGITAL SIGNAL PROCESSOR

(75) Inventor: Steven R. Jahnke, Tokyo (JP)

(73) Assignee: Texas Instruments Incorporated, Dallas, TX (US)

( * ) Notice: Subject to any disclaimer, the term of this patent is extended or adjusted under 35 U.S.C. 154(b) by 487 days.

(21) Appl. No.: 10/256,588

(22) Filed: Sep. 27, 2002

(65) Prior Publication Data

US 2004/0064494 A1    Apr. 1, 2004

(51) Int. Cl.
G06F 17/15    (2006.01)
G06F 17/10    (2006.01)

(52) U.S. Cl. .................................... 708/420; 708/315

(58) Field of Classification Search ................ 708/420, 708/603, 315
See application file for complete search history.

(56) References Cited

U.S. PATENT DOCUMENTS 5,511,015 A * 4/1996 Flockencier ............... 708/420
5,822,609 A * 10/1998 Richter ...................... 712/35
6,477,555 B1 * 11/2002 Hartung .................... 708/420
6,643,412 B1 * 11/2003 Hong et al. ................ 382/279

OTHER PUBLICATIONS

Oppenheim et al., "Signals and Systems", 1983. pp. 79-84.*
Stanford Exploration Project, "Convolution Equation and Program", 2 pages, Oct. 21, 1998. (http://sepwww.stanford.edu/prof/pvi/cs/paper_html/node6.html).*

* cited by examiner

Primary Examiner—Chuong D Ngo
(74) Attorney, Agent, or Firm—Robert D. Marshall, Jr.; Wade J. Brady, III; Frederick J. Telecky, Jr.

(57) ABSTRACT

A programming algorithm reduces from $\theta(2N^2)$ to $\theta(N^2)$ the number of multiply-and-accumulate (MAC) instructions required to perform a discrete-time convolution on a programmable digital signal processor. Through the use of a single repeat instruction along with a single repeat count register, the algorithm dynamically changes the number of times the multiply-accumulate instruction is repeated depending upon the current term being convolved. The avoids performing the multiply-accumulate when one term is zero. The nature of the discrete-time convolution calculation and the flexibility of a re-programmable single repeat count register offers permits this. Additional instructions are required for data pointer alignment. The trade-off between reduced multiply-accumulate operations and the overhead required to achieve it is examined.

4 Claims, 3 Drawing Sheets

DISCRETE-TIME CONVOLUTION CYCLE REDUCTION WITH PROGRAMMABLE DIGITAL SIGNAL PROCESSOR

TECHNICAL FIELD OF THE INVENTION

The technical field of this invention is discrete convolution operations on digital signal processors.

BACKGROUND OF THE INVENTION

Discrete time convolution is one of the most common applications for a traditional digital signal processor. On a programmable digital signal processor, the convolution sum Y(n) is efficiently handled by a single repeat instruction, followed by a multiply-accumulate instruction (MAC), nested within a block repeat process. This requires on the order of N×N multiply-accumulate operations to form a complete discrete convolution sum Y(n). In a real-time digital signal processor application where the convolution sum is performed often, this calculation will be a large portion of the entire system cycle count. Any reduction in the convolution sum calculation can have a large impact on system performance.

Current algorithms for the convolution sum computation focus on minimal instruction count and fast single "repeat multiply-accumulate" operations. Overhead is kept to a minimum through the use of circular buffering and auto increment of data pointers in the multiply-accumulate instruction. The circular buffer is one which will be automatically reset to the 'beginning address' when the 'last address' is incremented.

No concern has typically been given for whether the multiply-accumulate operation is being performed on overlapping or non-overlapping terms. For some very specific function that uses the convolution sum, such as a finite impulse response (FIR) function, there may even exist a special instruction that combines unique properties of that function for faster execution.

SUMMARY OF THE INVENTION

This invention describes an approach for eliminating multiply-accumulate operations for non-overlapping terms in discrete time convolution computations. This computation requires a multiplier-accumulate operation only when the terms to be convolved have overlapping components. The nature of the convolution sum is such that for a given order of N, the total number of terms to be convolved, at time step n, there are only n overlapping components. The other (N-n) components are equal to 0.

The present invention does not perform a multiplier-accumulate operation for the non-overlapping terms. This reduces the number of required multiply-accumulate operations typically to one-half the normal number used.

On current digital signal processors there exists a single repeat count register, usually labeled CSR. Use of this counter allows the user to dynamically change the number of times a single 'repeat multiply-accumulate' process is performed. As a result, a multiply-accumulate operation occurs only when terms overlap.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
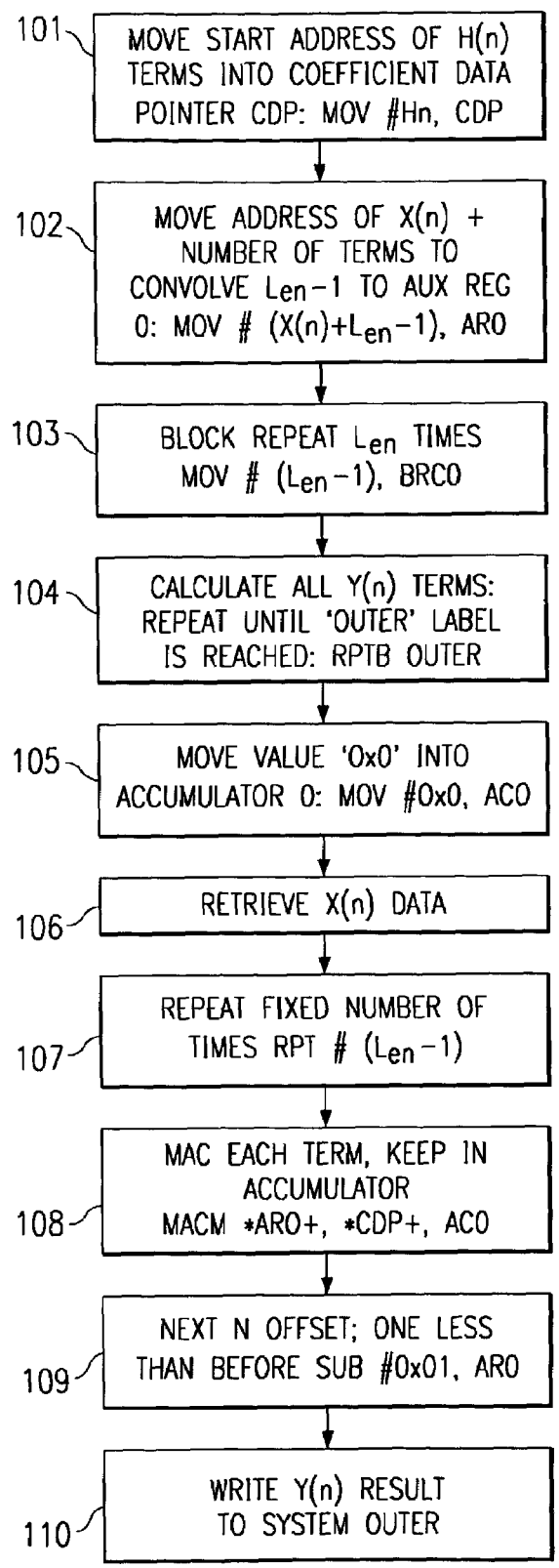
FIG. 1 illustrates the flow diagram for first portion of discrete convolution computation using a fixed number of single 'repeat-multiply-accumulate' operations of the prior art.

This invention describes an approach for eliminating multiply-accumulate operations for non-overlapping terms in discrete time convolution computations. This computation performs a multiplier-accumulate operation only when the terms to be convolved have overlapping components. The nature of the convolution sum is such that for a given order of N, the total number of terms to be convolved, at time step n, there are only n overlapping components. The other N-n components are equal to 0.

Eliminating the multiply-accumulate operations for non-overlapping terms potentially permits more efficient execution. One issue that must be addressed is how much overhead is added to determine how many non-overlapping terms there are. Using the single-repeat count register, a hardware register within the central processor unit, efficient placement of terms to be convolved in memory and the nature of the convolution sum equation, the overhead required to dynamically change the single repeat count register can be kept to three cycles on a typical digital signal processor. These three cycles include one cycle to reload both X(k) and H(n) pointers, and one ADD instruction to keep track of the loop count. This loop count is kept in the repeat count register. This low overhead is achievable because of efficient processing made possible by the programmable digital signal processor. This efficient processing is generally not present in reduced instruction set computer (RISC) architectures. The technique of this invention can be applied to any algorithm that uses a convolution sum and is not specialized for a specific operation. This is in contrast to special instructions adapted for a single algorithm such as the finite-impulse response (FIR) filter instruction, which is usable only for the efficient implementation of a finite-impulse response filter.

The present invention does not perform a multiply-accumulate operation for the non-overlapping terms. This can reduce the number of multiply-accumulate operations, cutting them in half in the convolution sum computation. However, in order to dynamically change the repeat count register, additional overhead needs to be added in the code. Selected digital signal processors allow this overhead to be kept to three additional cycles in the 'block repeat' processes. When the number of terms to convolve is small, the required code overhead will require more processing than is saved in reducing multiply-accumulate operations. As the number of terms to convolve increases, the overhead becomes small compared to what is saved in reduced multiply-accumulate operations.

The discrete-time convolution sum of Y(n) can be written as:

$$Y(n) = \sum_{k=0}^{N} X(k)H(n-k)$$

Where H(n−k) is a discrete-time component of some transfer function of the system, shifted by the current time step, and X(k) is the discrete-time component of the input function. To calculate the convolution sum of Y(n) at any given time step, each overlapping X(k) and H(n−k) component must be multiplied together. These products are then added to generate the single Y(n) term. Where there is no overlap between X(k) and H(n−k), the product is 0. This adds no component to the final sum.

This may be illustrated by an example. Consider an N-4 input stream having values, X(k), of 1, 3, 4 and 2 is to be convolved with the transfer function, H(n) having values, 4, 2, 1 and 3. At each time step n, the data is multiplied and then summed as shown in Table 1 below.

TABLE 1

|  | Transfer function H(n) |  |  |  |  |  |  |
|---|---|---|---|---|---|---|---|
| Time |  |  |  | 3 | 1 | 2 | 4 |
| n = 0 | 2 | 4 | 3 | 1 | 0 | 0 | 0 |
| n = 1 | 0 | 2 | 4 | 3 | 1 | 0 | 0 |
| n = 2 | 0 | 0 | 2 | 4 | 3 | 1 | 0 |
| n = 3 | 0 | 0 | 0 | 2 | 4 | 3 | 1 |
| n = 4 | 0 | 0 | 0 | 0 | 2 | 4 | 3 |
| n = 5 | 0 | 0 | 0 | 0 | 0 | 2 | 4 |
| n = 6 | 0 | 0 | 0 | 0 | 0 | 0 | 2 |

The terms Y(n) are calculated as follows:

$Y(0) = 3 \times 1 + 0 \times 0 + 0 \times 0 + 0 \times 0 = 3$ $Y(1) = 3 \times 3 + 1 \times 1 + 0 \times 0 + 0 \times 0 = 10$ $Y(2) = 3 \times 4 + 1 \times 3 + 2 \times 1 + 0 \times 0 = 17$ $Y(3) = 3 \times 2 + 1 \times 4 + 2 \times 3 + 4 \times 1 = 20$ $Y(4) = 3 \times 0 + 1 \times 2 + 2 \times 4 + 4 \times 3 = 22$ $Y(5) = 3 \times 0 + 1 \times 0 + 2 \times 2 + 4 \times 4 = 20$ $Y(6) = 3 \times 0 + 1 \times 0 + 2 \times 0 + 4 \times 2 = 8$ For n<0 and n>6, there is no overlap between X(k) and H(n−k), thus Y(n)=0.

On a programmable digital signal processor, the convolution sum of all Y(n) is efficiently handled by a single repeat (RPT) instruction, followed by a multiply-accumulate instruction, nested within a 'block repeat' operation. The single repeat-multiply-accumulate operation calculates the individual Y(n) term, while the 'block repeat' operation performs the single repeat-multiply-accumulate for each Y(n) term. With the use of circular buffering on both the X(k) and H(n−k) terms, both data pointers can be returned to their desired position with no additional overhead inside the block repeat process. This results in the total number of multiply-accumulate instructions to be performed to be of $\theta(2N^2)$. This assumes that the target memory for X(k) has been zeroed out before the storing of the X(k) term.

As can be clearly seen in this example, unless n=k, there will always be a zero term in the Y(n) calculation, which will result in wasted multiply-accumulate instruction cycles in the single 'repeat-multiply-accumulate' operation. The number and position of these zero terms at any given time step k is predictable. These zeros occur where there is no overlapping X(k) and H(n−k) terms. According to this invention, the multiply-accumulate operation is performed only when the X(k) and H(n−k) terms overlap. This will effectively reduce to one-half the number of multiply-accumulate operations that need to be performed. With the use of the single repeat register (CSR) that is found on many programmable digital signal processors, it is possible to dynamically change the number of times a multiply-accumulate operation occurs in the single 'repeat-multiply-accumulate' operation.

However, since the number of multiply-accumulate operations that will occur will be dynamically changed, the data pointers for X(k) and H(n) must be re-loaded within the block repeat process. The circular buffers no longer have a fixed boundary. The number of total terms needs to be calculated in each Y(n) operation. This will result in more overhead than the fixed single 'repeat-multiply-accumulate' case. The balance, therefore, is to determine when the benefits of having a total reduction in multiply-accumulate operations outperform the additional overhead incurred by reloading the X(k) and H(n) data pointers in each 'block repeat' process.

In the example that follows it is important to define the term 'circular buffering'. Circular buffering involves an address range obeying the rule, that when the 'last address' is reached, the circular buffer will be automatically reset to the 'beginning address' when the 'last address' is incremented. For example, assume the circular buffer range is from hex address 0x100 to hex address 0x104. Reading from the buffer proceeds along with address incrementing as in an *AR0+ operation: read the address and increment it. The loop is for four counts and auxiliary AR0 will proceed from 0x101, 0x102, 0x103, 0x104 and then return to 0x100 instead of incrementing to 0x105. The relevance of circular buffering is indicated in the description of FIG. 1 below.

Also by way of definition, the repeat counter register RC0 employed below is a hardware register within the central processor unit. The value in this register will indicate the number of times the following instruction is to be repeated.

Consider an example of how discrete convolution may be computed with a fixed number of single 'repeat-multiply-accumulate' operations on a typical digital signal processor. The code represented by the flow diagram of FIG. 1 shows how to do the first half of the discrete convolution, that part with n<N.

First, in block 101 the starting address of the H(n) terms is moved into the coefficient data pointer (CDP) register. Next, block 102 loads the starting address of the X(n) terms (X(n)+$L_{en}$−1) placed into auxiliary register zero (AR0). Block 103 moves the length $L_{en}$−1 into block repeat counter register zero (BRC0). This sets an outer loop repeat of $L_{en}$ times. Circular buffering is set up in block 103 by putting a value into the BRC0 register and enabling the circular buffering. Blocks 104 and 107 through 109 constitute a loop with the label 'OUTER' terminating the loop. Block 104 calls up the Y(n) computation operation accomplished by code blocks 107 through 110 and this is concluded at the point the 'OUTER' label is reached. Block 105 zeros the accumulator by moving hex 0x0 into accumulator Ac0. Block 106 recalls the data X(n). This recall is not shown in detail because is depends upon the resources of the particular digital signal processor employed. Block 107 sets the number of repeats of the multiply-accumulate multiple (MAC) operation of block 108 to $L_{en}$ times. In block 108, the data stored at the address in auxiliary register zero AR0 is multiplied by the data stored at the address in coefficient data pointer CDP. the result is accumulated in accumulator register AR0. Block 108 also increments the address in auxiliary register zero (*AR0+) and in coefficient data pointer (*CDP+) for the next multiply.

At the conclusion of the block 108 MAC instructions, the AR0 register will be automatically reset by the circular buffering. Block 109 increments the count single repeat register (CSR). Block 110 outputs the computed convolution Y(n). This output is not shown in detail because is depends upon the resources of the particular digital signal processor employed. Block 110 is the end of the 'OUTER' loop.

The second half of the convolution where n>N can be done in a similar way. This requires just about the same number of cycles to complete. The fixed number, single repeat-multiply-accumulate computation utilizes circular buffering on both halves of the process.

Figure 2:
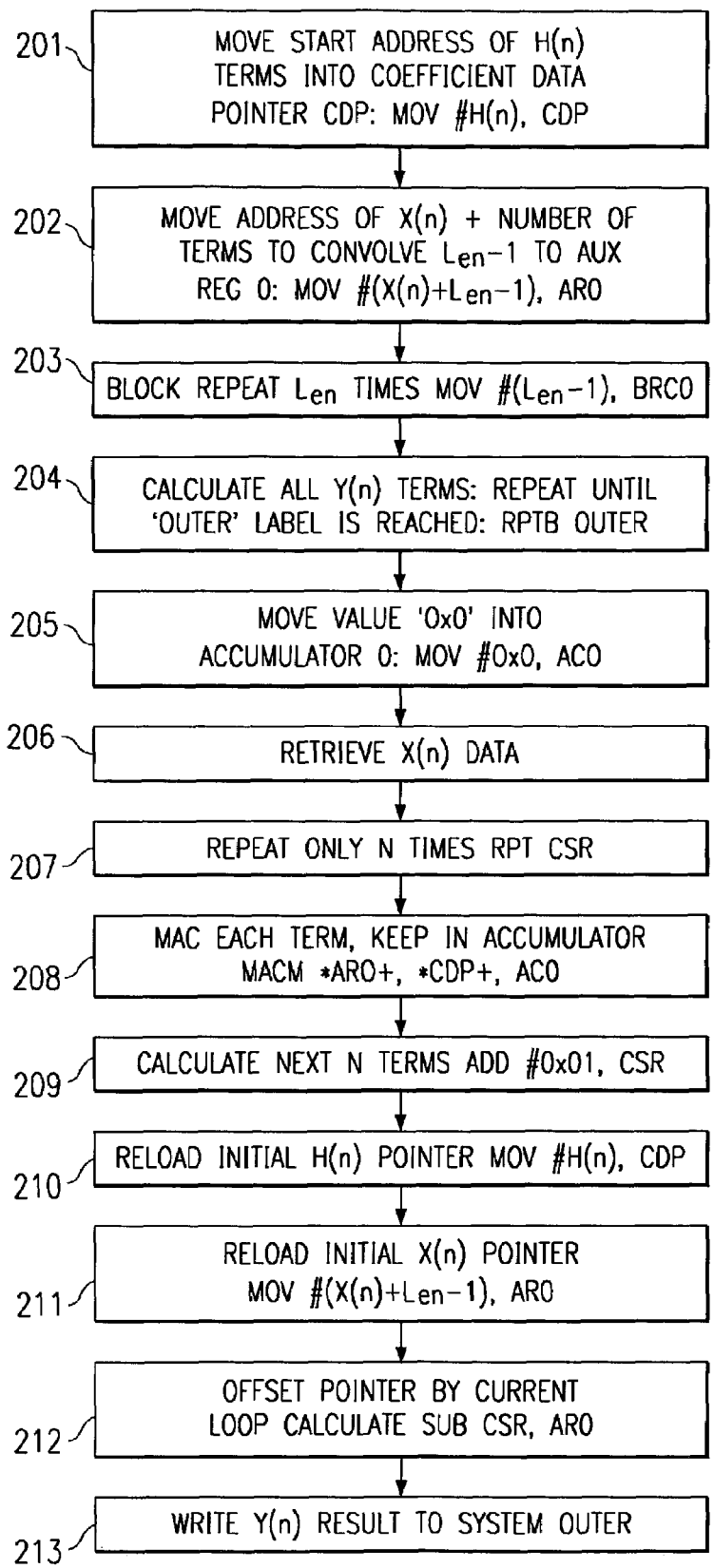
FIG. 2 illustrates the flow diagram for discrete convolution computation using variable number of single 'repeat-multiply-accumulate' operations.

FIG. 2 illustrates this same discrete convolution using a variable number of single 'repeat-multiply-accumulate' operations. In this code flow no circular buffering is required. Much of the code is the same as illustrated in FIG. 1. Blocks 201 through 206 and 208 correspond exactly to blocks 101 through 106 and 108 of FIG. 1. Block 201 moves the starting address of the H(n) terms into the coefficient data pointer (CDP) register. Block 202 moves the start address of the X(n) terms into auxiliary register zero (AR0). Block 203 sets the block repeat counter register zero (BRC0) to repeat $L_{en}$ times. Block 204 calls up the Y(n) computation operation accomplished by code blocks 207 through 213, the 'OUTER' loop. Block 205 zeros the accumulator by moving hex 0x0 into accumulator AC0. Block 206 recalls the data X(n). Block 207 sets the number of repeats for the following multiply-accumulate multiple (MAC) operation of block 208 to the number stored in the repeat count register (CSR). This is similar to block 107 except the number of repeats is variable from the repeat count register rather than the constant $L_{en}$. In block 208, the contents of auxiliary register location AR0 is multiplied by the content of register location CDP, and the result is accumulated in accumulator register AR0. Block 209 tracks the current time-step that is being calculated (k) in the operation ADD #0x01, CSR. This instruction keeps the position in the count single repeat (CSR) register. Block 209 differs from block 109. Both the X(n) and H(n) initial pointers must be reloaded. The H(n) pointer is reloaded in block 210 with the data in the count single repeat register in the operation MOV #X(n), CSR. Thus the RPT instruction no longer has a fixed value, but now takes the value of the count single repeat register (block 207). When determining where to put the X(k) pointer, it is no longer sufficient to just subtract one from the current position. Block 211 subtracts the value of the current (k) calculation once the X(k) pointer is reloaded in the operation MOV #(X(n)+$L_{en}$−1), AR0. Block 212 resets the offset pointer in the operation SUB CSR, AR0. This is similar to block 109 except that the offset pointer is decremented by the value in the count single repeat register rather than by 1. Block 213 outputs the computed convolution Y(n) as in block 110.

On typical digital signal processors, the ADD instruction (block 209) as well as the reloading of the pointers (blocks 210 and 211) can each be done in a single cycle. So the total additional overhead is three instruction cycles in the 'block-repeat' loop. For two instruction (blocks 207 and 209) the operands differ relative to the corresponding instructions in FIG. 1 (blocks 107 and 109). These instructions differ by require no additional overhead.

Figure 3:
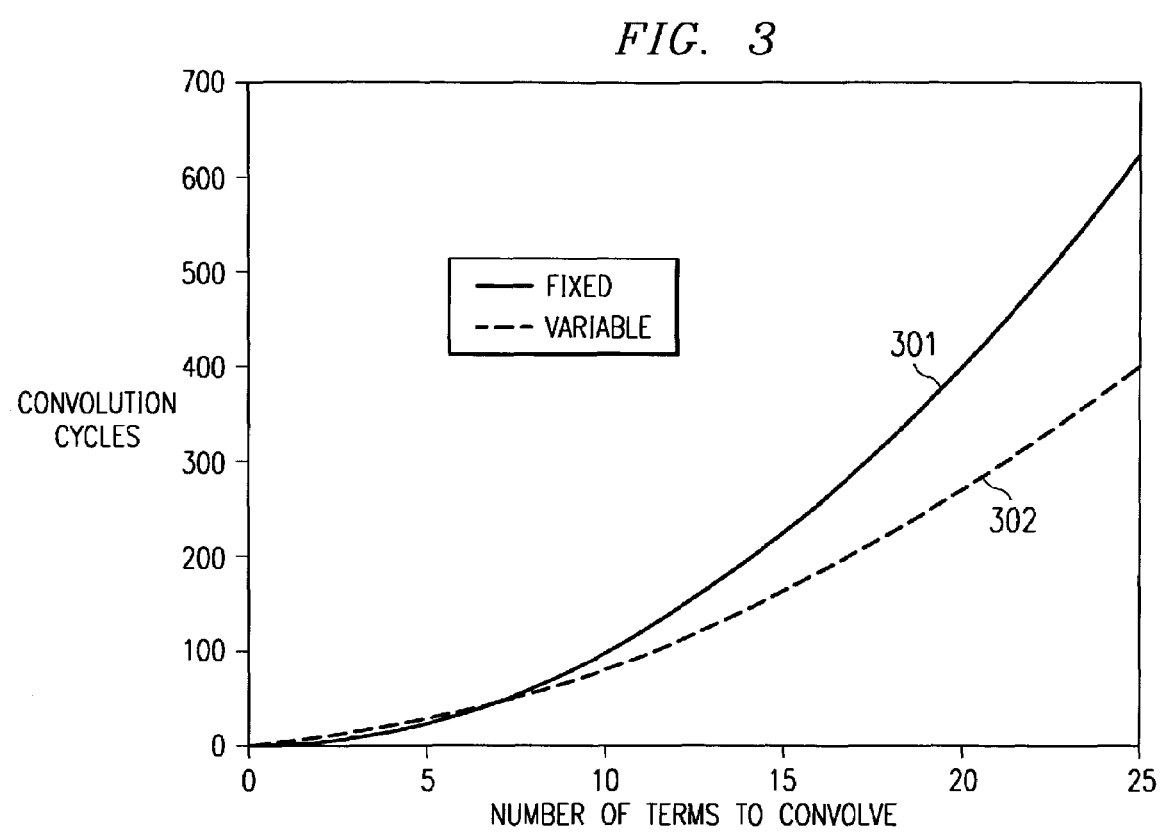
FIG. 3 illustrates the comparison of fixed multiply-accumulate operations versus variable multiply-accumulate operations in the computation of discrete-time convolution sums for a typical case.

In FIG. 3 the comparison of cycles required to do an entire Y(n) calculation for both fixed multiply-accumulate operations 301 and variable multiply-accumulate operations 302 with N=n is illustrated. As the number of overlapping terms increases, the effect of the over-head penalty is reduced, and performance is increased as the number of multiply-accumulate cycles is decreased. While the numbers of convolution cycles (vertical axis) and the number of terms to convolve (horizontal axis) given in FIG. 3 are meant to apply only to a typical digital signal processor the approach described in this invention is extendable to any digital signal processor with a repeat register and circular buffering.

Individual applications will vary based on system considerations, the number of processor cycles required to perform an entire convolution can be reduced significantly using the variable multiply-accumulate operation approach of this invention. If the convolution is only a few terms, the overhead required could outweigh the benefits of the reduced multiply-accumulate operations. However, as the number of terms increases, the benefits gained in reduced multiply-accumulate operations far outweighs the overhead cost.

Using the above code fragment on a typical digital signal processor, both techniques take the same number of cycles to complete a convolution sum. For a typical case as in the example given in FIG. 3, for N=7, there are at least seven X(n) and H(n) terms to be convolved. Referring again to FIG. 3, with N less than 7 the overhead required to dynamically change the repeat register is greater than the cycle savings received by reducing the number of multiply-accumulate operations. This only includes the total loop time, and does not take into account any zeroing of memory or circular buffer setup or other clock cycles that may be required. For convolutions with N greater than 7, the dynamically changed repeat register method of this invention requires fewer cycle than the prior art.

A convolution sum is one of the most common operations performed by a digital signal processor. In applications that perform a significant amount of real-time filtering or other algorithm where the convolution sum is used, any cycle reduction in the convolution sum operation can have a major impact on the performance of the entire application. In a programmable digital signal processor that has a repeat instruction hardware register, such as the CSR register on a typical digital signal processor, it is possible to dynamically change the number of times a multiply-accumulate operation occurs. Since a multiply-accumulate operation only needs to occur where the two functions to be convolved overlap, no multiply-accumulate cycles will be wasted on calculating zero-terms. Because the pointer alignment for the circular buffers is no longer fixed, both function pointers must be re-loaded on each convolution sum iteration. This overhead outweighs the benefits of reduced multiply-accumulate operations when the number of overlapping terms is less than seven. As the number of terms to be convolved increases, the convolution sum can be reduced from $\theta$ ($2N^2$) to $\theta$ $N^2$)

What is claimed is:

1. A computer implemented method of performing a filter function transforming a discrete time input signal X(k) into a discrete time output signal Y(k) according to a discrete time transfer function H(k) employing a programmable digital signal processor capable of performing a multiply-accumulate instruction of discrete time convolution of the form $$Y(n) = \sum_{k=0}^{N} X(k)H(n-k)$$

where: N is the number of terms of the convolution, H(n−k) is a discrete-time component of the transfer function, shifted by the current time step k, the method comprising:
  if N is less than or equal to seven, performing a multiply-accumulate of X(k) and H(n−k) by performing a multiply-accumulate instruction on said programmable digital signal processor for all k of 0 to N; and
  if N is greater than seven
    performing a multiply-accumulate of X(k) and H(n−k) when X(k) and H(n−k) are overlapping by performing a multiply-accumulate instruction on said programmable digital signal processor, and not performing a multiply-accumulate of X(k)H(n−k) when X(k) and H(n−k) are non-overlapping.

2. The computer implemented method of claim 1 wherein said programmable digital signal processor is capable of performing a repeat-multiply-accumulate instruction a number of times set by a single repeat count register further comprising:

if N is greater than seven repeating a multiply-accumulate of X(k) and H(n−k) by performing a repeat-multiply-accumulate instruction on said programmable digital signal processor for each k where X(k) is overlapping using a set index variable n to repeat from a first overlapping H(n−k) to a last overlapping H(n−k).

3. The computer implemented method of claim 1 further comprising:

if N is greater than seven loading pointers to X(k) and H(n−k) wherein single repeat count register is loaded with a number of overlapping time signals H(n).

4. A computer implemented method of performing a filter function transforming a discrete time input signal X(k) into a discrete time output signal Y(k) according to a discrete time transfer function H(k) employing a programmable digital signal processor capable of performing a multiply-accumulate instruction of discrete time convolution of the form $$Y(n) = \sum_{k=0}^{N} X(k)H(n-k)$$

where: N is the number of terms of the convolution, H(n−k) is a discrete-time component of some transfer function, shifted by the current time step, the method comprising:

storing H(n) data in a memory beginning at a first starting address;

storing X(n) data in a memory beginning at a second starting address;

loading a coefficient data pointer with said first starting address;

loading an auxiliary register with said second starting address;

setting a count single repeat register;

setting a block repeat counter register with a length of said time limited signals;

setting an accumulator to zero;

repetitively a number of times stored in said block repeat count register via a repeat multiply-accumulate instruction recalling H data from memory from an address corresponding to data in said coefficient data pointer, recalling X data from memory from memory from an address corresponding to data in said auxiliary register, multiplying the recalled H data by the recalled X data, adding a product of said multiplying to the contents of said accumulator, incrementing said coefficient data pointer to point to a next H data, and incrementing said auxiliary register to point to a next X data;

outputting a value of Y(n) corresponding to data stored in said accumulator;

calculating a next number of repeats by adding one to a count single repeat register;

reloading said coefficient data pointer register with data stored in said count single repeat register;

reloading said auxiliary register with a difference of a current auxiliary register value and the value of said count single repeat register; and repeating said steps of setting said accumulator to zero, repetitively performing said repeat multiply-accumulate instruction, calculating a next number of repeats, reloading said coefficient data pointer register and reloading said auxiliary register for all overlapping values of H and X.

* * * * *

UNITED STATES PATENT AND TRADEMARK OFFICE
CERTIFICATE OF CORRECTION

PATENT NO. : 7,580,965 B2
APPLICATION NO. : 10/256588
DATED : August 25, 2009
INVENTOR(S) : Steven R. Jahnke It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 822 days.

Signed and Sealed this

Fourteenth Day of September, 2010

David J. Kappos
*Director of the United States Patent and Trademark Office*